(12) United States Patent
Liu et al.

(10) Patent No.: US 10,495,488 B2
(45) Date of Patent: Dec. 3, 2019

(54) ELECTRIC FIELD TIME-GRATING LINEAR DISPLACEMENT SENSORS BASED ON SINGLE ROW MULTILAYER STRUCTURE

(71) Applicant: Chongqing University of Technology, Chongqing (CN)

(72) Inventors: Xiaokang Liu, Chongqing (CN); Donglin Peng, Chongqing (CN); Kai Peng, Chongqing (CN); Fangyan Zheng, Chongqing (CN)

(73) Assignee: Chongqing University of Technology, Chongqing (CN)

( * ) Notice: Subject to any disclaimer, the term of this patent is extended or adjusted under 35 U.S.C. 154(b) by 411 days.

(21) Appl. No.: 15/228,733

(22) Filed: Aug. 4, 2016

(65) Prior Publication Data

US 2017/0003145 A1    Jan. 5, 2017

Related U.S. Application Data

(63) Continuation of application No. PCT/CN2014/083125, filed on Jul. 28, 2014.

(30) Foreign Application Priority Data

Mar. 19, 2014  (CN) .......................... 201410102437.6

(51) Int. Cl.
*G01D 5/241* (2006.01)
*G01B 7/02* (2006.01)

(52) U.S. Cl.
CPC ............... *G01D 5/241* (2013.01); *G01B 7/02* (2013.01); *G01D 5/2415* (2013.01)

(58) Field of Classification Search
CPC ........ G01D 5/20; G01D 5/204; G01D 5/2053; G01D 5/2086; G01D 5/2258; G01D 5/241; G01D 5/2415; G01D 5/2412; G01D 5/243; G01D 5/2451
USPC .......................... 324/207.11–207.26, 658, 660
See application file for complete search history.

(56) References Cited

U.S. PATENT DOCUMENTS

| | | | | | |
|---|---|---|---|---|---|
| 4,459,702 A | * | 7/1984 | Medwin | ............... | G01D 5/2415 324/725 |
| 4,633,249 A | * | 12/1986 | Sasaki | .................. | G01D 5/2415 324/725 |
| 4,743,838 A | * | 5/1988 | Eckerle | ................ | G01D 5/2415 324/660 |

(Continued)

FOREIGN PATENT DOCUMENTS

| CN | 1869594 A | 11/2006 |
|---|---|---|
| CN | 2869768 Y | 2/2007 |

(Continued)

OTHER PUBLICATIONS

International Search Report, Application No. PCT/CN2014/083125, dated Dec. 31, 2014, 5 pages.

(Continued)

*Primary Examiner* — Jeff W Natalini
*Assistant Examiner* — Steven L Yeninas
(74) *Attorney, Agent, or Firm* — JCIPNET

(57) ABSTRACT

An electric field type time-grating linear displacement sensor based on a single row multilayer structure, including a moving ruler and a fixed ruler. The moving ruler having a row of induced electrodes and the fixed ruler having a row of excitation electrodes.

6 Claims, 3 Drawing Sheets

(56) References Cited

U.S. PATENT DOCUMENTS

| | | | | |
|---|---|---|---|---|
| 4,788,546 | A | * | 11/1988 | Sasaki .................. G01D 5/243 324/660 |
| 4,879,508 | A | * | 11/1989 | Andermo ............... G01B 7/003 324/690 |
| 5,068,653 | A | * | 11/1991 | Klingler ................. G01B 7/02 324/161 |
| 6,492,911 | B1 | * | 12/2002 | Netzer ................ G01D 5/2415 318/662 |
| 6,525,546 | B1 | * | 2/2003 | Zhao .................... G01B 7/003 324/658 |
| 9,250,058 | B2 | * | 2/2016 | Backes ................... G01B 7/30 |
| 9,714,846 | B2 | * | 7/2017 | Baxter ................ G01D 5/2412 |
| 2005/0092108 | A1 | * | 5/2005 | Andermo ............ G01D 5/2415 73/862.626 |
| 2010/0148802 | A1 | * | 6/2010 | Uchida ............... G01D 5/2415 324/661 |

FOREIGN PATENT DOCUMENTS

| | | |
|---|---|---|
| CN | 101556138 A | 10/2009 |
| CN | 102288100 | 12/2011 |
| CN | 102425987 A | 4/2012 |
| CN | 103591896 A | 2/2014 |
| CN | 103822571 A | 5/2014 |
| EP | 1596203 A1 | 11/2005 |
| JP | 08278105 | 10/1996 |
| JP | 08327306 A | 12/1996 |
| JP | 2009047547 A | 3/2009 |
| JP | 2013205407 A | 10/2013 |
| WO | WO 2015/078301 A1 | 6/2015 |
| WO | WO 2015/139403 A1 | 9/2015 |
| WO | WO 2015/168992 A1 | 11/2015 |

OTHER PUBLICATIONS

International Search Report, Application No. PCT/CN2014/090968, dated Jan. 21, 2015, 4 pages.
International Search Report, Application No. PCT/CN2014/083215, dated Jan. 28, 2015, 4 pages.
International Search Report for PCT/CN2014/090968, dated Jan. 21, 2015, 4 pages.
English translation of International Search Report for PCT/CN2014/090968, dated Jan. 21, 2 pages.

* cited by examiner

ELECTRIC FIELD TIME-GRATING LINEAR DISPLACEMENT SENSORS BASED ON SINGLE ROW MULTILAYER STRUCTURE

RELATED APPLICATIONS

This application is a continuation of copending International Application No.: PCT/CN2014/083125, filed Jul. 28, 2014, which is incorporated herein by reference in its entirety, and additionally claims priority to Chinese Application No.: 201410102437.6, filed Mar. 19, 2014, which is also incorporated herein by reference in its entirety.

TECHNICAL FIELD

The present invention relates to sensors for precision linear displacement measurement.

BACKGROUND ART

In the technical fields of precision linear displacement measurement, in recent years, a new type of time-grating sensor has been developed in China. This time-grating sensor uses a clock pulse as the reference for displacement measurements. And based on the foregoing, a time-grating linear displacement sensor based on alternating electric field has been further developed. The patent application document for this sensor has been published on Dec. 21, 2011 with its Title of Invention as "Time-grating linear displacement sensor based on alternating electric field" and a patent number of 201110145967.5.

The proposed time-grating linear displacement sensor based on alternating electric field has adopted a differential capacitance structure, which functions by using two rows of electrodes to form two channels of standing wave signals, and then the two channels of standing wave signals are combined into a traveling wave signal by an adding circuit. However, it has been noted that the two rows of electrode signals may interfere with each other, which may lead to an increase of measurement errors, and thus hinder further improvements in its measurement accuracy. On the other hand, concerning its manufacturing process, it is difficult to ensure a consistency between the two rows of electrodes; In addition, concerning its installation, it is difficult to ensure consistent electric field coupling strengths between the two rows of electrodes as well. As a result, the foregoing issues may result in an inconsistency in amplitude of the generated two channels of standing wave signals, which will lead to measurement errors and thus compromise its applications in industrial field.

SUMMARY OF INVENTION

The objective of the present invention is to solve the above mentioned deficiencies of the existing technologies, and provide an electric field type time-grating linear displacement sensor based on a single row multilayer structure. It employs the electrodes based on a single row multilayer structure, which are able to solve the problems of interference between signals of the two rows of electrodes, avoid the problems of inconsistency between the two rows of electrodes resulting from production or installation. In addition, it is able to directly obtain the traveling wave signal based on electric field coupling mechanism without an adding circuit. In this way, it can reduce measurement errors, reduce the requirements for installation accuracy, as well as simplify system structure.

The technical solution of the present invention is as follows:

An electric field type time-grating linear displacement sensor based on a single row multilayer structure, comprising two parts, namely a moving ruler and a fixed ruler.

There is a row of induced electrodes on the moving ruler body, and there is a row of excitation electrodes on the fixed ruler body. The 4n+1 order of the fixed ruler electrodes are connected to one group, where n=0, 1, 2, 3 . . . , to form an excitation group A, the 4n+2 order of the fixed ruler electrodes are connected to one group to form an excitation group B, the 4n+3 order of the fixed ruler electrodes are connected to one group to form an excitation group C, and the 4n+4 order of the fixed ruler electrodes are connected to one group to form an excitation group D; in addition, the moving ruler and the fixed ruler are arranged in upper and lower positions that are parallel to each other, wherein the electrodes of the moving ruler body are directly facing the electrodes of the fixed ruler body with a space δ therebetween, so as to form a coupled capacitor.

The moving ruler moves relative to the fixed ruler; the relative overlapping areas between the moving ruler electrodes and the electrodes of four excitation groups A, B, C and D exhibit periodical changes of from zero to small, from small to large, from large to small and from small to zero. As a result, the respective capacitance values undergo periodical changes as well. In addition, four sinusoid excitation signals $U_a$, $U_b$, $U_c$ and $U_d$ with the same amplitude same frequency and at phase difference of 90 degrees sequentially are applied to the four excitation groups A, B, C and D of the fixed ruler respectively, so as to generate a channel of traveling wave signal $U_o$ from the moving ruler electrodes. The foregoing channel of traveling wave signal and a channel of reference signal $U_r$ with the same frequency and fixed phase undergo a shaping process through a shaping circuit and a phase comparison profess through a phase comparison circuit. The phase difference between the foregoing two channels of signals are represented by the number of interpolated high frequency clock pulses, which then undergoes a scale transformation, so as to obtain the linear displacement between the moving ruler and the fixed ruler.

The fixed ruler body is sequentially covered by four layers of medium films. The first layer is a metal film, which are formed by spraying into four excitation signal leads. The foregoing four excitation signal leads connect the corresponding electrodes of each of the four excitation groups A, B, C and D into one group. The second layer is an insulation film; the third layer is also a metal layer, which forms a row of fixed ruler electrodes; and the fourth layer is an insulation protection film.

Further, the fixed ruler electrodes are in rectangular shape and in the same size. In addition, two neighboring electrodes have been isolated by an insulation interval. And the four excitation signal leads are routed below the middle of the fixed ruler electrodes.

The shape of the moving ruler electrode is a double sinusoidal shape formed by two vertically symmetrical sinusoidal shapes. Two neighboring moving ruler electrodes are connected via a rectangular lead. The length of moving ruler electrodes is slightly shorter than the length of fixed ruler electrodes. The width of moving ruler electrode is equal to a sum of the width of fixed ruler electrode and an insulation interval thereof. Moreover, the width between two neighboring moving ruler electrodes is equal to 3 times of the width of moving ruler electrode. The area of the rectangular leads of the moving ruler electrodes can completely cover the facing four excitation signal leads of the fixed ruler electrodes.

More specifically, the shape of the moving ruler electrode (1-1) is formed by the area defined by the sine curve within the range [0, π] and the x-axis and the area defined by the sine curve within the range [π, 2π] and the x-axis. In this way, a coupled capacitor, whose directly overlapping area changing on sine manner has been obtained. Thus, a modulated displacement signal is then achieved as well.

The excitation group A of the fixed ruler electrodes and the corresponding moving ruler electrodes form a coupled capacitor $C_1$; the excitation group B of the fixed ruler electrodes and the corresponding moving ruler electrodes form a coupled capacitor $C_2$; the excitation group C of the fixed ruler electrodes and the corresponding moving ruler electrodes form a coupled capacitor $C_3$; and the excitation group D of the fixed ruler electrodes and the corresponding moving ruler electrodes form a coupled capacitor $C_4$. In addition, two members and the other two members of the four coupled capacitors $C_1$, $C_2$, $C_3$, and $C_4$ work in an alternative way, wherein when two of the four capacitors work, the other two capacitors have capacitance value of zero. The moving ruler electrodes output the traveling wave signal $U_o$. Further, the foregoing traveling wave signal $U_o$ and the reference signal $U_r$ with the same frequency undergo a shaping process to form two channels of square waves, which then undergo a further phase comparison process.

The technical solution of the present invention employs a new approach of electric field coupling based on single row multilayer structure to form electric traveling waves directly. It has combined different advantages from a variety of different types of grating type displacement sensors which employ equal spatial division as the measurement standard.

The present invention has the beneficial effects as follows: it employs an alternating electric field generated by a single row of parallel capacitor plates to realize displacement measurement; Using the moving ruler electrodes with alternating coupled capacitor structure, it is able to directly induce electric traveling waves; And high frequency clock pulses are used as displacement measurement reference. As a result, the sensor provided in the present invention has the advantages including low power consumption, high precision, achieving displacement measurement with nanometer precision, simple structure, low requirements for mechanical installation accuracy, and high stability in industrial applications.

BRIEF DESCRIPTION OF DRAWINGS

FIG. 1 (b) is a schematic view showing the relative position between the electrodes on the fixed ruler and the electrodes on the moving ruler.

DESCRIPTION OF EMBODIMENTS

The present invention will be further described in reference to the accompanying drawings.

Figure 1:
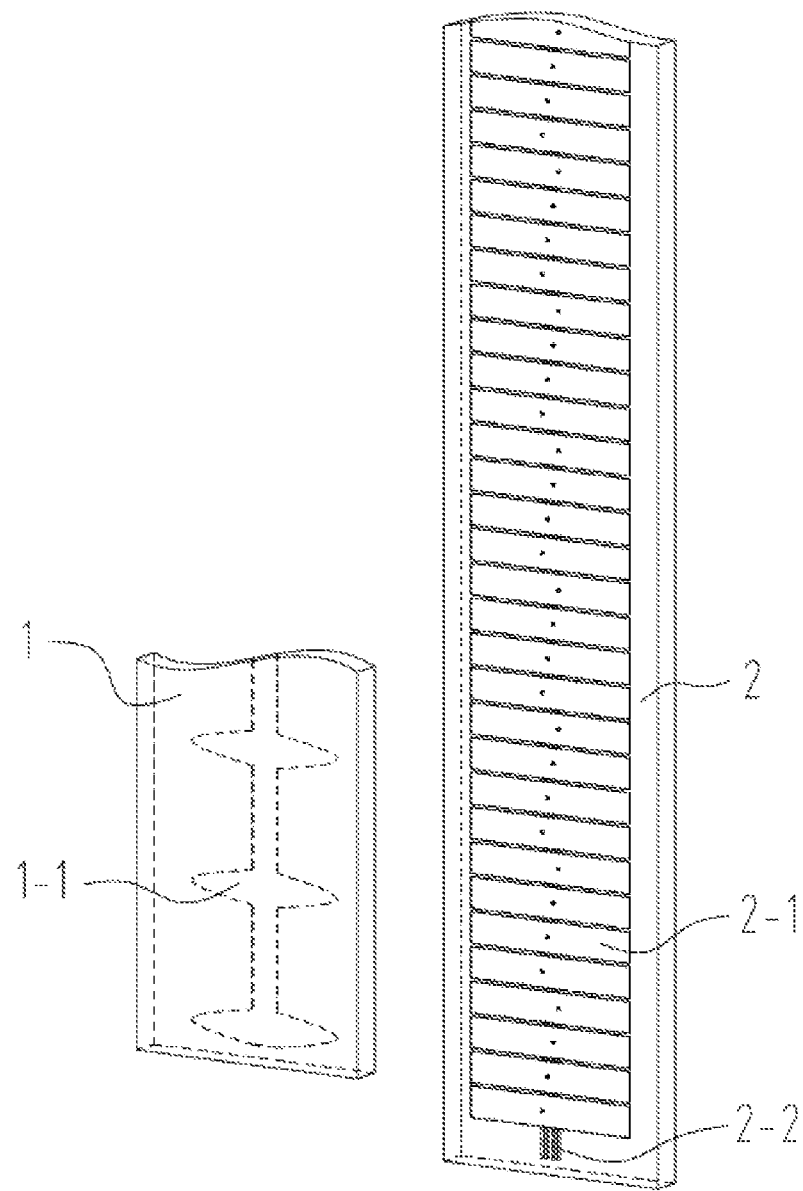
FIG. 1 (a) is a schematic view of the electrodes on the fixed ruler and moving ruler.
Figure 1:
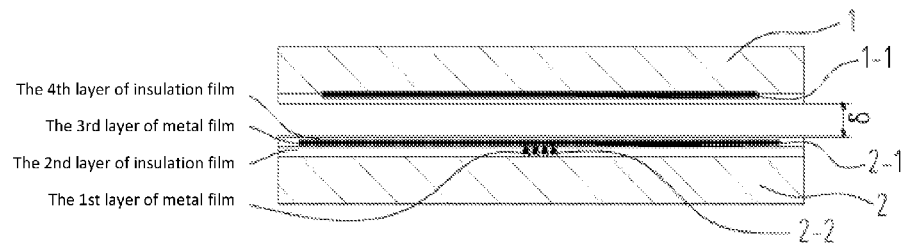
Figure 2:
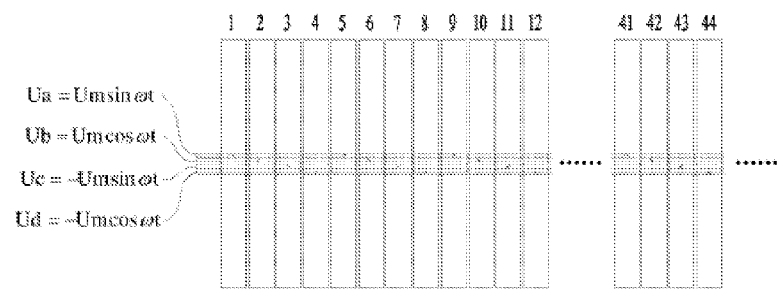
FIG. 2 is a diagram of signal connection for the fixed ruler electrodes.
Figure 3:
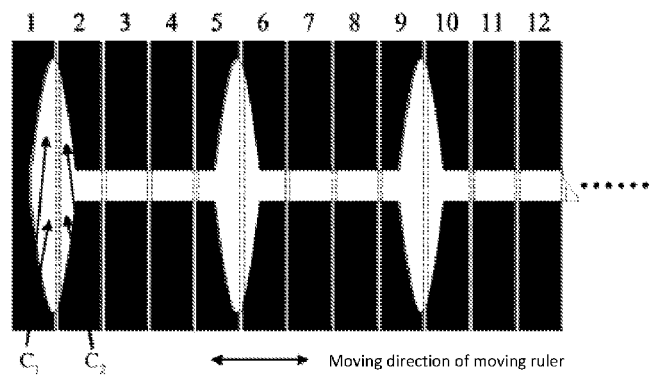
FIG. 3 is a schematic view of the coupled capacitor formed by the moving ruler electrodes and the fixed ruler electrodes.
Figure 4:
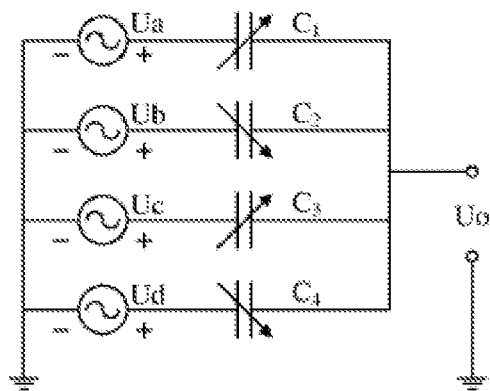
FIG. 4 is a schematic view of the circuit model.

As shown in FIG. 1 (a), FIG. 1 (b), FIG. 2, FIG. 3 and FIG. 4, the proposed sensor comprises two parts, namely a fixed ruler 1 and a moving ruler 2 which are formed by a ceramic material; and the ceramic surface has been sprayed with a layer of iron nickel alloy as the electrodes thereof.

The moving ruler 1 has 12 induced electrodes in total, which is referred to as the induced electrode 1-1. The size of each induced electrode is 18 mm*1.1 mm. In addition, the shape of the moving ruler electrode is formed by the area defined by the sine curve within the range [0, π] and the x-axis and the area defined by the sine curve within the range [π, 2π] and the x-axis. Further, the rectangular lead with a width of 1.8 mm connected the moving ruler electrodes together.

The fixed ruler body is covered by four layers of medium films. The first layer is a metal film. The second layer is an insulation film. The third layer is also a metal layer. The fourth layer is an insulation protection film. The first layer of metal film includes 4 flat band shaped conducting leads, namely the excitation signal leads 2-2, which connect the electrodes corresponding to each one of the four excitation groups A, B, C and D into one group. In addition, the third layer of metal film is a row of rectangular electrodes in the same size, namely the fixed ruler electrodes 2-1. The size of each of the foregoing fixed ruler electrodes is 20 mm*1 mm. The width of insulation interval between two neighboring electrodes is 0.1 mm.

The No. 1, 5, 9 . . . 41 . . . electrodes among the fixed ruler electrodes are connected together to become a group, which thus forms an excitation group A, and an excitation signal $U_a=U_m \sin \omega t$ has been added to the excitation group A; the No. 2, 6, 10 . . . 42 . . . electrodes among the fixed ruler electrodes are connected together to become a group, which thus forms an excitation group B, and an excitation signal $U_b=U_m \cos \omega t$ has been added to the excitation group B; the No. 3, 7, 11 . . . 43 . . . electrodes among the fixed ruler electrodes are connected together to become a group, which thus forms an excitation group C, and an excitation signal $U_c=-U_m \sin \omega t$ has been added to the excitation group C; and the No. 4, 8, 12 . . . 44 . . . electrodes among the fixed ruler electrodes are connected together to become a group, which thus forms an excitation group D, and an excitation signal $U_d=-U_m \cos \omega t$ has been added to the excitation group D. In addition, the excitation signal peak value $U_m$=5V, frequency f=40 KHz, and angular frequency $\omega=2\pi f=8\times10^4\pi$.

The moving ruler 1 and the fixed ruler 2 are arranged in upper and lower positions that are parallel to each other, wherein the moving ruler electrodes 1-1 are directly facing the fixed ruler electrodes 2-1 with a space δ=0.5 mm therebetween. In this way, the moving ruler electrodes 1-1 and the electrodes of the excitation group A of the fixed ruler form a coupled capacitor $C_1$; the moving ruler electrodes 1-1 and the electrodes of the excitation group B of the fixed ruler form a coupled capacitor $C_2$; the moving ruler electrodes 1-1 and the electrodes of the excitation group C of the fixed ruler form a coupled capacitor $C_3$; and the moving ruler electrodes 1-1 and the electrodes of the excitation group D of the fixed ruler form a coupled capacitor $C_4$.

As shown in FIGS. 3 and 4, when the moving ruler moves towards right, the relative overlapping area of the $C_1$ capacitor changes from large to small; the relative overlapping area of the $C_2$ capacitor changes from small to large; with the moving displacement of the moving ruler equal to one width of the moving ruler electrode, the relative overlapping area of the $C_1$ capacitor becomes zero, the relative overlapping area of the $C_2$ capacitor starts to change from large to small, and the relative overlapping area of the $C_3$ capacitor changes from small to large. Moreover, after the moving ruler has moved in the same direction for another width of electrode, the relative overlapping area of the $C_2$ capacitor becomes zero, the relative overlapping area of the $C_3$ capacitor starts to change from large to small, and the relative overlapping area of the $C_4$ capacitor changes from small to large. Further, after the moving ruler has moved in the same direction for another width of electrode, the relative overlapping area of the $C_3$ capacitor becomes zero, the relative overlapping area of the $C_4$ capacitor starts to change from large to small, and the relative overlapping area of the $C_1$ capacitor changes from small to large. In this way, it has completed one cycle of mechanical movement; and accordingly, the capacitance values of the four coupled capacitors $C_1$, $C_2$, $C_3$, and $C_4$ exhibit a cycle of periodical changes as well. The output traveling wave signal $U_o$ of the moving ruler electrode has the expression of first harmonic as follows:

$$U_o = K_e U_m \sin(\omega t + \pi x/W) \qquad (1)$$

In the foregoing equation, $K_e$ is electric field coupling coefficient, x is the relative displacement between the moving ruler and the fixed ruler, W is a distance of 4 times of width of moving ruler electrode.

Figure 5:
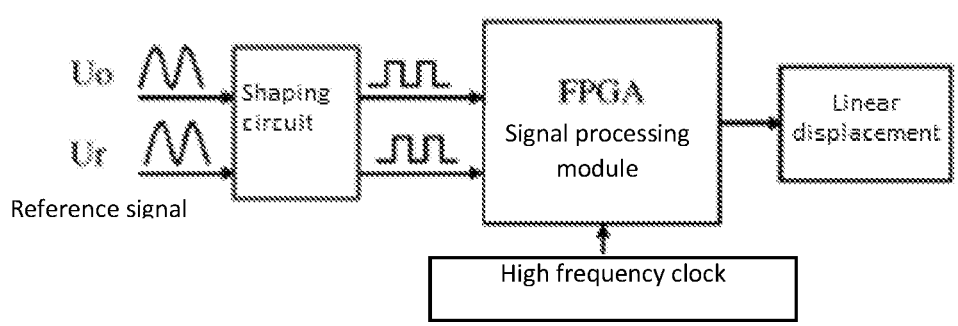
FIG. 5 is a block diagram of the signal processing.

As shown in FIG. 5, the sine traveling wave signal $U_o$ and a channel of reference signal $U_r$ with the same frequency and fixed phase are sent to a shaping circuit for processing, which are then transformed into two channels of square signals with the same frequency, and then sent to a phase comparison circuit for further processing. The phase difference of the forgoing two channels of signals is obtained through an interpolated high frequency clock pulse technology. The linear displacement between the fixed ruler and the moving ruler is finally obtained through further calculation and processing.

The foregoing is only certain preferred embodiments of the present invention, which are not intended to limit the present invention. Any modifications, substitution and improvement within the ideals and principles of the present invention should be covered within the scope of the present invention.

What is claimed is:

1. An electric field type time-grating linear displacement sensor based on a single row multilayer structure, comprising:
   a moving ruler; and
   a fixed ruler;
   wherein there is a row of moving ruler electrodes on the moving ruler;
   wherein there is a just one row of fixed ruler electrodes on the fixed ruler, the 4n+1 order of the fixed ruler electrodes are connected to one group, where n=0, 1, 2, 3 . . . , to form an excitation group A, the 4n+2 order of the fixed ruler electrodes are connected to one group to form an excitation group B, the 4n+3 order of the fixed ruler electrodes are connected to one group to form an excitation group C, and the 4n+4 order of the fixed ruler electrodes are connected to one group to form an excitation group D;
   wherein the moving ruler and the fixed ruler are arranged in upper and lower positions that are parallel to each other;
   wherein the moving ruler electrodes are directly facing the fixed ruler electrodes with a space δ therebetween, so as to form a coupled capacitor;
   wherein the moving ruler moves relative to the fixed ruler;
   wherein four sinusoid excitation signals Ua, Ub, Uc and Ud with the same amplitude and same frequency at phase difference of 90 degree sequentially are applied to the four excitation groups A, B, C and D of the fixed ruler, so as to generate a channel of traveling wave signal Uo from the moving ruler electrodes;
   wherein the channel of traveling wave signal and a channel of reference signal Ur with the same frequency and fixed phase undergo a shaping process through a shaping circuit and a phase comparison process through a phase comparison circuit, a phase difference between the foregoing two channels of signals are represented by the number of interpolated high frequency clock pulses, which then undergoes a scale transformation, so as to obtain the linear displacement between the moving ruler and the fixed ruler,
   wherein a shape of the moving ruler electrode is a double sinusoidal shape formed by two vertically symmetrical sinusoidal shapes, two neighboring moving ruler electrodes are connected via a rectangular lead, a length of moving ruler electrode is slightly shorter than the length of fixed ruler electrode, a width of moving ruler electrode is equal to a sum of the width of fixed ruler electrode and an insulation interval thereof, and the width between two neighboring moving ruler electrodes is equal to 3 times the width of fixed ruler electrode; and the area of the rectangular leads of the moving ruler electrodes can completely cover the facing four excitation signal leads of the fixed ruler electrodes.

2. The electric field type time-grating linear displacement sensor based on the single row multilayer structure as set forth in claim 1, wherein: the fixed ruler body is sequentially covered by four layers of medium films, wherein a first layer is a metal film, which are formed by spraying into four excitation signal leads, and the four excitation signal leads connect the corresponding electrodes of each one of the four excitation group A, B, C and D into one group; a second layer is an insulation film; a third layer is a metal layer, which forms a row of fixed ruler electrodes; and a fourth layer is an insulation protection film.

3. The electric field type time-grating linear displacement sensor based on the single row multilayer structure as set forth in claim 1, wherein: the fixed ruler electrodes are in rectangular shape and in the same size, and two neighboring electrodes have been isolated by an insulation interval; and the four excitation signal leads are routed below the middle of the fixed ruler electrodes.

4. The electric field type time-grating linear displacement sensor based on the single row multilayer structure as set forth in claim 1, wherein a shape of the moving ruler electrode is a double sinusoidal shape formed by two vertically symmetrical sinusoidal shapes and a rectangular lead between two vertically symmetrical sinusoidal shapes, each moving ruler electrode having a shape comprising a first area defined by a sine curve over a range $[0, \pi]$ configured above the rectangular lead and a second area defined by a sine curve over a range $[\pi, 2\pi]$ configured below the rectangular lead and symmetric to the first area about the rectangular lead, a length of each moving ruler electrode is shorter than a length of each fixed ruler electrode, a width of each moving ruler electrode is equal to a sum of a width of each fixed ruler electrode and an insulation interval thereof, and a width between two neighboring moving ruler electrodes is equal to 3 times the width of each moving ruler electrode.

5. The electric field type time-grating linear displacement sensor based on the single row multilayer structure as set forth in claim 1, wherein: the excitation group A of the fixed ruler electrode and the corresponding moving ruler electrodes form a coupled capacitor C1; the excitation group B electrodes and the corresponding moving ruler electrodes form a coupled capacitor C2; the excitation group C electrodes and the corresponding moving ruler electrodes form a coupled capacitor C3; the excitation group D electrodes and the corresponding moving ruler electrodes form a coupled capacitor C4; two members and the other two members of the four coupled capacitors C1, C2, C3, and C4 work in an alternative way to form a coupling channel of the alternating electric field; and the moving ruler electrodes output a traveling wave signal Uo.

6. The electric field type time-grating linear displacement sensor based on the single row multilayer structure as set forth in claim 1, wherein the traveling wave signal Uo and a reference signal Ur with the same frequency undergo a shaping process to form two channels of square waves, which then undergo a further phase comparison process.

\* \* \* \* \*